United States Patent Office 3,242,078
Patented Mar. 22, 1966

3,242,078
SUSPENDING COLLOIDAL CALCIUM CARBONATE IN HYDROCARBON OILS
Charles S. Lynch, Plainfield, N.J., assignor to Esso Research and Engineering Company, a corporation of Delaware
No Drawing. Filed Dec. 16, 1960, Ser. No. 76,104
2 Claims. (Cl. 252—32.7)

This invention concerns improvements in the preparation of colloidal suspensions of calcium carbonate in petroleum hydrocarbon oils including lubricating oils, fuel oils, motor fuels, and the like. Such suspensions or dispersions are useful for imparting corrosion inhibiting properties particularly to lubricating oil compositions intended for the crankcases of internal combustion engines. The colloidal suspensions are preferably prepared in a hydrocarbon oil medium containing an oil soluble surfactant, thus imparting both corrosion inhibiting and detergent properties to the composition.

In recent years there has been an increasing demand for lubricating oils for piston type internal combustion engines that will have high detergency and at the same time will possess satisfactory resistance to oxidation and freedom from corrosive tendencies. High detergency oxidation resistant lubricating oils serve to keep the internal combustion engine free of varnish, sludge, and coke-like deposits, and thereby promote longer engine life through reduced wear. Heavy duty detergent type lubricating oil compositions must be able to maintain a high degree of engine cleanliness. To attain this the compositions must be able to disperse insoluble material formed by combustion of the fuel or resulting from oil oxidation. Additionally, the composition must be capable of neutralizing acidic materials originating either from oxidation of the lubricating oil or from combustion products of the fuel. Such acidic materials are objectionable not only from the corrosion standpoint but because of their tendency to produce engine varnish.

In the development of heavy duty lubricants for internal combustion engines, experience has shown that compositions possessing a high reserve of alkalinity are quite valuable for this service in that they act to neutralize acidic materials which form during use of the lubricant. Complexes or colloidal dispersions having a high ratio of metal to organic acid component have been found to be particularly desirable as detergent additives for crankcase lubricants. Colloidal dispersions of calcium carbonate in mineral oil bases containing oil soluble surfactants are recognized as one of the particular classes of such detergent additive. However, it has been found difficult in the past to prepare such dispersions that are satisfactory from the standpoints of stability and of high metal to surfacant ratio.

It is a principal object of the present invention to furnish a suitable method for preparing colloidal dispersions of calcium carbonate in hydrocarbon oils that will be superior to the prior art compositions of this nature.

In accordance with the present invention it has been found that a colloidal suspension of calcium carbonate in a hydrocarbon medium can be prepared by treating with carbon dioxide a solution of calcium hydrogen sulfide in a lower molecular weight alcohol of 1 to 3 carbon atoms. The treatment of the solution, in alcohol, preferably in methanol, is done in the presence of a hydrocarbon oil solution of an oil soluble surfactant, care being taken to maintain the alcohol concentration at a relatively low level during the later stages of the preparation. The concentration of calcium hydrogen sulfide in the alcohol solution many range from 6.8 to 9 weight percent calcium. The concentration of oil soluble surfactant in the hydrocarbon oil solution may range from about 5 to about 40 percent by weight. Reaction temperatures may range from 100 to 200° F.

A colloidal suspension of calcium carbonate in a medium made up of an oil plus an oil-soluble surfactant can be prepared by $CO_2$ treating a methyl alcohol solution of $Ca(SH)_2$ in the presence of the combined oil, oil-soluble surfactant medium. Good agitation is required. The concentration of colloidal $CaCO_3$ that can be suspended depends on the specific conditions used. A product of about 7.5/1 metal/surfactant ratio can be produced by adding the required amount of $Ca(SH)_2$ directly to the surfactant in oil and $CO_2$ treating. The temperature can be 100° to 150° F. and the $CO_2$ can be added in 0.5 to 3 hours. This procedure is not applicable, however, for preparing a high metal content product, i.e., one having a 9.5/1, or higher metal/surfactant ratio product. A very viscous emulsion, which cannot be stirred, is obtained when about 80% of the $CO_2$ is added. This results in a low calcium yield and a hazy product that is difficult to filter.

In the present invention colloidal dispersions of calcium carbonate are successfully prepared in which the metal to surfactant ratio exceeds a value of 8 to 1 and is preferably 9.5 to 1 or higher. This is done by carefully controlling the relative amount of methanol or related aliphatic alcohol that is present during the preparation. There must be sufficient methanol present to retain the unreacted $Ca(SH)_2$ in solution. Above about 7.5% 1 metal to surfactant ratio the alcohol cannot be more than 25 vol. percent of the total mixture. At lower metal contents the alcohol content is not critical as long as enough is present to retain the $Ca(SH)_2$ in solution.

Among the oil soluble surfactants that can be used in practicing the present invention are included alkyl phenols, alkyl phenol sulfides, petroleum sulfonic acids, synthetic sulfonic acids, phosphosulfurized hydrocarbons, dialkyl dithiophosphoric acids, and their respective salts. The cations of the salt can be Ca, Ba, Na, K, Li, Zn, and $NH_4$.

The preferred dialkyl dithiophosphoric acid is one made with an alcohol containing 14 to 30 carbon atoms. It is prepared by reacting 4 mols of the alcohol with 1 mol of $P_2S_5$ at 150–250° F. for 1 to 8 hours. Solids, representing unreacted materials, are filtered out. A $C_{20}$ oxo alcohol is quite satisfactory for this purpose.

Phosphosulfurized hydrocarbons can be prepared by reacting a sulfide of phosphorus, for example $P_2S_5$, with a suitable hydrocarbon base stock which, of course, should be one that results in materials the are completely oil soluble after phosphosulfurization. The preferred hydrocarbon starting materials used in this invention are (1) heavy petroleum fractions, distillates or residua containing less than 5% of aromatics and having a viscosity at 210° F. of 140 to 250 SSU; and (2) polyolefins having a Staudinger molecular weight in the range of 500 to 200,000 and containing 2 to 6 carbon atoms per olefin monomer. The polybutenes, having Staudinger molecular weights in the range of 700 to 100,000, are particularly preferred.

Preferably the phosphosulfurized hydrocarbon is prepared by reacting approximately four moles of hydrocarbon base stock (e.g., a polyolefin) per mole of phosphorus pentasulfide. A slight excess of phosphorus pentasulfide over the 1 to 4 mole ratio can be used to insure complete phosphosulfurization. The phosphosulfurization reaction is conducted under anhydrous conditions at temperature of 150° to 600° F. for a period in the range of 0.5 to 15 hours. A very slight amount of an alkyl phenol or alkyl phenol sulfide, preferably in the range of 0.001 to 1.0 percent by weight, can be added as a catalyst in the phosphosulfurization reaction. It has also proven very useful to treat or blow the phosphosulfurized product with an inert gas such as nitrogen for a period of 10 min. to 2 hours to aid in reducing hydrogen sulfide evolution and its corresponding odor. The preparation of phosphosulfurized hydrocarbons and the use of catalysts in the phosphosulfurization reaction are more fully described in U.S. Patent 2,875,188.

The sulfonates used are also well known in the art. The sulfonic acids can be obtained through the sulfonation of either synthetic or natural hydrocarbons. The preferred sulfonic acids have a molecular weight in the range of 300 to 700 (as the sodium soap). The synthetic acids preferably have a narrower molecular weight in the range of 400 to 600. The acids can contain more than one sulfonyl group in the molecule. Suitable sulfonic acids are produced by sulfonating alkyl aromatic hydrocarbons such as didodecyl benzene. They can also be obtained by treatment of lubricating oil base stocks with concentrated or fuming sulfuric acid in a conventional manner to produce oil-soluble "mahogany" acids.

The manner in which this invention may be practiced will be understood when reference is made to the accompanying examples.

EXAMPLE 1

The balance among methyl alcohol concentration, $Ca(SH)_2$ concentration and $CO_2$ treat can be accomplished by a staging technique explained by the following example. 455 grams of a 30% synthetic calcium sulfonate in oil solution was charged to a 2 liter 4-necked flask equipped with a $CO_2$ bubbler, thermometer, condenser and a stirrer. To this was added 496 grams of a methyl alcohol solution of $Ca(SH)_2$ containing 7.1% calcium. The mixture was heated to 150° F. and $CO_2$ treated for 85 minutes at the rate of 0.0175 mol $CO_2$/minute. At this time 3 grams from the flask gave a clear solution with 75 ml. of a 50/50 mixture of isopropyl alcohol and benzene. (The end point test.) The methyl alcohol was distilled from the flask, leaving a colloidal suspension of calcium carbonate in the sulfonate solution which was clear without filtering It contained 8.73% calcium. In the second stage, 310 grams of this product was put in a 4-necked flask with the apparatus described above. 92 grams of the above $Ca(SH)_2$ in methyl alcohol solution was added. The mixture was $CO_2$ treated at 150° F. for 27 minutes at the rate of 0.0055 mol $CO_2$/minute. A clear solution was obtained in the isopropanol-benzene test described above. The product remaining after removing the methyl alcohol from the flask was clear without filtering and contained 10.0% calcium. This product contained about 9.5 equivalents of calcium per equivalent of sulfonate. Additional stages could be used to prepare still higher calcium content products.

EXAMPLE 2

A high calcium content product can be prepared in a single stage by careful control of the operating conditions In this case only about 20% of the $Ca(SH)_2$ solution is added initially. The remainder is added simultaneously with the $CO_2$ treatment. Methyl alcohol is removed by distillation at the same rate it is added in the $Ca(SH)_2$ solution. It is essential not to over-treat the $CO_2$ at any point in the process. Over-treating will result in a hazy unfilterable product that is low in calcium.

EXAMPLE 3

Viscosity is one factor that limits the concentration of a colloidal metal carbonate which can be suspended in a medium made up of an oil plus an oil soluble surfactant. One aspect of the present invention involves contacting the metal carbonate suspension with water at temperatures of 150–250° F. for periods of say 30 to 60 minutes. In the preparation of colloidal metal carbonate suspension by a staging technique, this viscosity breaking process can be used between stages to keep the viscosity of the product within workable limits.

The following example illustrates this. 300 grams of a calcium sulfonate, fortified with a suspension of colloidal $CaCO_3$ so that it contained 10.8% calcium, was heated to 220° F. While the suspension was stirred, 30 grams of water was added, which reduced the temperature to 190° F. The temperature was then raised to 220° F. in about 30 minutes. At that time the temperature was increased more rapidly to 350° F., while nitrogen blowing, to remove the water. The product remained clear and had a viscosity of 319 SUS at 210° F. which is to be compared with an original viscosity of 401 SUS. Thus viscosity was reduced substantially.

While methanol is the alcohol preferred, other low molecular weight alcohols can be used, such as ethyl, isopropyl, and n-propyl alcohol. The latter, however, have less solvency for the hydrosulfide compounds. Bases other than $Ca(SH)_2$ such as the corresponding magnesium and barium compounds may be used with suitable solvents but their low solubility generally renders them less useful.

Some investigators have suggested use of alcohols up to and including $C_6$. However, with the lower solubility of the higher alcohols, for the initial compounds, together with the alcohols having greater solvency for surfactants, there is a greater tendency to remove surfactant from the oil. This tends to destroy the colloidal suspension.

A rather critical factor is the concentration of the alcohol, specifically of methanol. This apparently is controlled by the concentration of the colloidal calcium carbonate. For a calcium content (as carbonate) of 10 to 11%, the maximum alcohol concentration should be about 25 vol. percent. For a 12% calcium the alcohol should be somewhat less, whereas, for a 9% calcium material it may be higher. Roughly, about 10 moles of alcohol (methanol) to 1 mole of surfactant appears to be about the maximum. Beyond this undesirable emulsions are formed. These figures are based on starting with an oil of about 30% sulfonate or surfactant content.

The $Ca(SH)_2$ solutions prepared in this study have contained from 6.8 to 7.7 percent calcium by analysts, in solutions which have been substantially saturated. Some investigators have claimed slightly higher calcium content, up to 9%, apparently calculated on the basis of neutralization number.

The $Ca(SH)_2$ can be prepared by treating either calcium hydroxide or calcium oxide with $H_2S$.

Apparently, the rate of $CO_2$ addition is not particularly critical. At present an addition time of ½ to 8 hours seems suitable, with 1 to 4 hours preferred. Excess $CO_2$ should be avoided. A reasonable excess will give a hazy product which cannot be filtered. A large excess may coagulate and precipitate carbonate.

As previously mentioned, the $Ca(SH)_2$ can be prepared by $H_2S$ treating CaO or $Ca(OH)_2$. Because of the extra mole of $H_2O$ for the $Ca(OH)_2$ product, the latter is preferred since a high calcium product can be obtained without an intermediate water treat. This cannot be done with the CaO product.

An important aspect of this invention lies in the control of methanol to prevent emulsions. Another investigator, e.g. French Patent 1,208,338, suggests using a light hydrocarbon, but this complicates the process.

EXAMPLE 4

*Procedure for dispersing colloidal $CaCO_3$ in sulfonates*

Sulfonate in oil, or sulfonic acid oil, is weighed into a 4-necked flask equipped with thermometer, gas sparger, condenser, and stirrer. A predetermined weight of $Ca(SH)_2$ solution in methanol is also added to the flask. The mixture, with agitation, is heated to reflux temperature, about 150–155° F. Then 100 to 125% theoretical $CO_2$ is added gradually in one half to one and one half hours. The end point of $CO_2$ treatment is determined by obtaining a clear solution. For testing, 3 grams of material from the flask is dissolved in 75 ml. of a 49.5/49.5/1 benzene/isopropanol/water mixture. The alcohol is then removed by nitrogen blowing and the product is dried at 300° F. This material is then cooled below 150° F. and a new charge of $Ca(SH)_2$ solution added to the flask. The above process is then repeated. This cycle is repeated until the desired concentration of $CaCO_3$ has been suspended. The product is then filtered, if hazy.

The $Ca(SH)_2$ solution is prepared by $H_2S$ treating $Ca(OH)_2$ or CaO in methanol until no more $H_2S$ will react. The solution is then filtered through filter aid.

If the $Ca(SH)_2$ solution is made with CaO, it is best to give the product a water treat after about 8% calcium has been added. This is done by adding slowly 10% of water to the product at about 240° F. The water will cool the material to 180–190° F. It should be held at this temperature for about one half hour before evaporating the water.

The data are tabulated below.

EXAMPLE 5

*Preparation of high calcium calcium sulfonate by staging technique*

| STAGE I | | |
|---|---|---|
| Ca(SH)$_2$ Charged to make Percent Ca [1] | 8 | 7.5 |
| CO$_2$ Treat, Percent Theory on Ca | 100 | 112 |
| Ca in Product, Percent | 7.60 | 7.44 |
| STAGE II | | |
| Ca(SH)$_2$ Charged to Make Percent Ca [1] | 9.8 | 8.8 |
| CO$_2$ Treat, Percent Theory on Ca | 95 | 125 |
| Ca in Product, Percent | 9.72 | 8.91 |
| STAGE III | | |
| Ca(SH)$_2$ Charged to Make Percent Ca [1] | 11.3 | 10.8 |
| CO$_2$ Treat, Percent Theory on Ca | 108 | |
| Product Inspections | | |
| Specific Gravity | 1.095 | |
| Calcium, Percent | 11.01 | 10.10 |
| Sulfur, Percent | 1.96 | 1.70 |
| Carbonate | 12.41 | 12.04 |
| Total Base No. | 273.5 | 252.1 |
| Viscosity SUS at 100° F | 3,023 | 1,967 |
| Viscosity SUS at 210° F | 186.2 | 138 |
| 5% in White Oil ASTM Color | 2 | 2– |
| 5% in White Oil Nephelometer | 29 | 8 |
| 5% in White Oil Nephelometer on Unfiltered Product | 45 | 80 |
| Calcium Utilization, Percent | 97.5 | 94.6 |
| Metal/Surfactant Equiv. Ratio | 10.5 | 9.7 |

[1] Weight percent calcium calculated in the product

EXAMPLE 6

*Preparation of high-calcium calcium sulfonate starting with 10% sulfonic acid in oil*

| STAGE I | | | | | |
|---|---|---|---|---|---|
| Ca(SH)$_2$ Charged to Make Percent Ca [1] | 5 | 3 | 1.25 | 1.30 | 2.70 |
| CO$_2$ Treat, Percent Theory on Ca | [2] 150 | 125 | 0.33 | 50 | 91 |
| Ca$_2$ in Product, Percent | | [3] 2.66 | 0.86 | 1.19 | 2.6 |
| STAGE II | | | | | |
| Ca(SH)$_2$ Charged to Make Percent Ca [1] | | | [4] 3 | 4.0 | 3.70 |
| CO$_2$ Treat, Percent Theory on Ca | | | 125 | 155 | 115 |
| Ca in Product, Percent | | | 2.29 | 2.72 | 3.41 |
| STAGE III | | | | | |
| Ca(SH)$_2$ Charged to Make Percent Ca [1] | | | 5 | 5 | 4.70 |
| CO$_2$ Treat, Percent Theory on Ca | | | 125 | 160 | 120 |
| Product Inspections: | | | | | |
| Calcium, Percent | | | 3.60 | 3.25 | [5] 3.99 |
| 5% in White Oil Nephelometer | | | 36 | 93 | 12 |
| 5% in White Oil ASTM Color | | | 2½ | 2– | 2– |
| Metal/Surfactant Equiv. Ratio | | | 10.1 | 9.2 | 12.4 |

[1] Weight percent calcium calculated in product.
[2] Unable to obtain end point; product solidified on removing methanol.
[3] Almost impossible to filter.
[4] Filtered before Stage II.
[5] Water treated before filtering.

EXAMPLE 7

*Dispersion of Ca carbonate in sodium sulfonate*[1] [2]

|  | Source [1] or [2] | | | | |
|---|---|---|---|---|---|
|  | [1] | [1] | [2] | [2] | [2] |
| STAGE I | | | | | |
| Ca(SH)$_2$ Charged to Make Percent Ca [3] | 5.4 | 5.0 | 6.0 | 6.3 | 6.4 |
| CO$_2$ Treat, Percent Theoretical on Ca | 108 | 180 | 112 | 150 | 113 |
| Ca in Product, Percent | 4.87 | 5.04 | 6.01 | -------- | -------- |
| Na in Product, Percent | 1.2 | [4] 1.15 | 0.95 | -------- | -------- |
| STAGE II | | | | | |
| Ca(SH)$_2$ Charged to Make Percent Ca [3] | -------- | -------- | [5] 8.76 | [5] 8.3 | [5] 8.9 |
| CO$_2$ Treat, Percent Theoretical on Ca | -------- | -------- | 112 | 110 | 118 |
| Ca in Product, Percent | -------- | -------- | 7.92 | -------- | -------- |
| Na in Product, Percent | -------- | -------- | 0.72 | -------- | -------- |
| STAGE III | | | | | |
| Ca(SH)$_2$ Charged to Make Percent Ca [3] | -------- | -------- | 11.2 | 9.5 | 10.6 |
| CO$_2$ Treat, Percent Theoretical on Ca | -------- | -------- | 112 | 110 | 122 |
| Ca in Product, Percent | -------- | -------- | 9.67 | -------- | -------- |
| Na in Product, Percent | -------- | -------- | 0.84 | -------- | -------- |
| STAGE IV | | | | | |
| Ca(SH)$_2$ Charged to Make Percent Ca [3] | -------- | -------- | -------- | 10.5 | 11.5 |
| CO$_2$, Percent Theoretical on Ca | -------- | -------- | -------- | 110 | 114 |
| Ca in Product, Percent | -------- | -------- | -------- | 10.32 | 10.78 |
| Na in Product, Percent | -------- | -------- | -------- | 0.88 | 0.74 |
| Sp. Gr. of Product at 77° F | -------- | -------- | -------- | 1.095 | 1.120 |
| 5% in White Oil Nephelometer | -------- | -------- | -------- | 89 | 50 |
| 5% in White Oil ASTM Color | -------- | -------- | -------- | 2− | 2− |

[1] Sonneborn Na Sulfonate Diluted to 30% soap.
[2] Commercial Oil Solution Diluted to 30%. Percent Soap−Na=1.25%.
[3] Weight Percent Calcium Calculated in the Product.
[4] Very Difficult to Filter.
[5] Filtered Between Stages I and II.

What is claimed is:

1. The process of preparing a colloidal dispersion of calcium carbonate in a hydrocarbon oil which comprises the steps of admixing a methanol solution of Ca(SH)$_2$, said solution containing from 6.8 to 9 weight percent of calcium, with a hydrocarbon oil solution of from 5 to 40 weight percent of an oil-soluble surfactant, the proportions of Ca(SH)$_2$ and surfactant being such as to provide in the final dispersion an equivalents ratio of calcium to oil-soluble surfactant exceeding a value of 8 to 1, the ratio of methanol to surfactant plus oil being maintained within the range of 10 to 25 percent by volume, heating the mixture to a temperature in the range of from 100 to 200° F., and then passing therethrough a stream of CO$_2$ in sufficient quantity to convert Ca(SH)$_2$ to CaCO$_3$, but not exceeding 125 percent of theoretical, and thereafter removing the alcohol from the mixture, said oil-soluble surfactant being selected from the group consisting of petroleum sulfonic acids, synthetic sulfonic acids, phosphosulfurized hydrocarbons and dialkyl dithiophosphoric acids, and their respective salts, wherein the cations of the salts are selected from the group consisting of Ca, Ba, Na, K, Li, Zn and HN$_4$.

2. Process as defined by claim 1 including a staging step wherein additional calcium carbonate is dispersed in the product by adding an alcohol solution of Ca(SH)$_2$ thereto and treating the resulting mixture with additional CO$_2$.

References Cited by the Examiner
UNITED STATES PATENTS

| 2,931,773 | 4/1960 | Thompson et al. | 252—18 |
| 2,937,991 | 5/1960 | Carlyle | 252—18 |
| 2,956,018 | 10/1960 | Carlyle et al. | 252—32.7 X |
| 3,027,325 | 3/1962 | McMillen et al. | 252—18 X |

FOREIGN PATENTS

| 789,820 | 1/1958 | Great Britain. |

DANIEL E. WYMAN, *Primary Examiner.*

JULIUS GREENWALD, *Examiner.*